UNITED STATES PATENT OFFICE 2,571,852

SUBSTITUTED AMINO ANALOGS OF PANTOTHENIC ACID AND PROCESS

Karl Folkers, Plainfield, and Frederick W. Holly, Cranford, N. J., assignors to Merck & Co., Inc., Rahway, N. J., a corporation of New Jersey No Drawing. Application April 20, 1949,
Serial No. 88,697

13 Claims. (Cl. 260—482)

This invention relates to new physiologically active substances having a vitamin-like action, and, more particularly, to amino analogs and substituted amino analogs of pantothenic acid.

Pantothenic acid has a structure corresponding to the following formula:

$$(CH_3)_2C-CHOHCONHCH_2CH_2COOH$$
$$\quad\quad\quad |$$
$$\quad\quad CH_2OH$$

while the amino analog and substituted amino analogs of pantothenic acid may be represented by the following general formula:

$$\quad\quad\quad NHR$$
$$\quad\quad\quad |$$
$$(CH_3)_2C-CHCONHCH_2CH_2COOR''$$
$$\quad\quad\quad |$$
$$\quad\quad CH_2OR'$$

wherein R represents a member selected from the group consisting of hydrogen, an acyl radical, and a carbobenzoxy radical, R' represents a member selected from the group consisting of hydrogen and an acyl radical and R'' represents a member selected from the group consisting of alkyl and aralkyl radicals.

These compounds are not only structurally similar to pantothenic acid but are also similar in function thereto having shown their effectiveness in stimulating the growth of bacteria. For example, the amino analog, ethyl $\beta'$-($\alpha$-amino-$\beta,\beta$-dimethyl-$\gamma$-hydroxybutyrylamino)-propionate was assayed for pantothenic acid activity for *Lactobacillus arabinosus*. On investigation, it was found that when an amount of pantothenic acid sufficient to yield one-half maximum growth was mixed with an equal quantity of the analog (0.02 microgram of each compound/10 ml. of broth), maximum growth resulted.

Up to the time of the present disclosure, none of the physiologically active compounds represented by the formula, supra, have either been synthesized or isolated from natural sources. In accordance with this disclosure, members of this group of compounds have now been prepared synthetically and identified. It may be noted that the $\alpha$-amino-$\gamma$-butyrolactones and derivatives thereof, more fully described in our copending application Serial No. 88,696, filed April 20, 1949, are used as intermediates in the preparation of this group of compounds.

Reactions for the preparation of ethyl $\beta'$-($\alpha$-amino-$\beta,\beta$-dimethyl-$\gamma$-hydroxybutyryl-amino)-propionate and the other members of this group of compounds may be represented by the following equations:

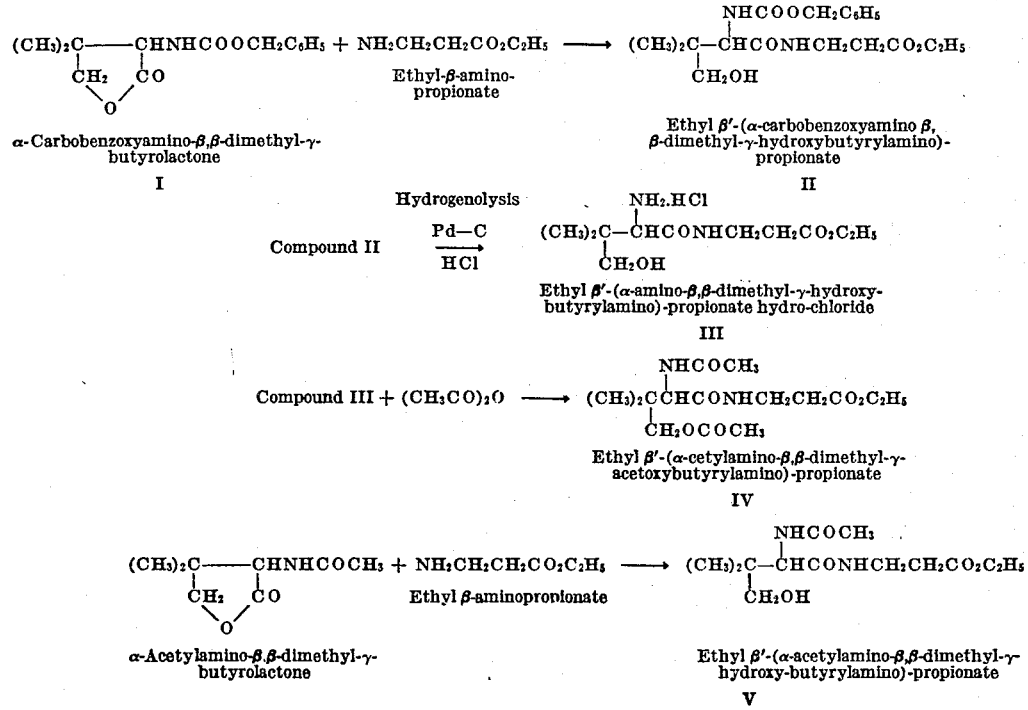

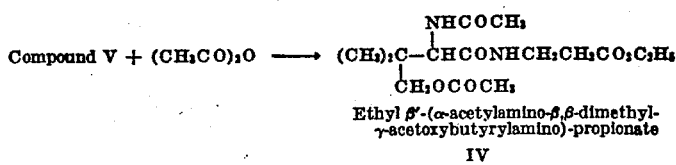

Ethyl β'-(α-acetylamino-β,β-dimethyl-
γ-acetoxybutyrylamino)-propionate

IV

Preparations of representative members of this new class of compounds will be illustrated in greater detail in the following examples, in which their synthesis from readily obtainable intermediates is described. It is to be understood that these examples are given by way of illustration and not to be considered as limiting the invention to the particular details described therein.

EXAMPLE I

*Ethyl β'-(α-carbobenzoxyamino-β,β-dimethyl-γ-hydroxybutyrylamino)-propionate*

A mixture of 2.5 g. of ethyl β-amino-propionate and 3.8 g. of α-carbobenzoxyamino-β,β-dimethyl-γ-butyrolactone (method of preparation detailed in our copending application Serial No. 88,696, filed April 20, 1949) was heated on a steam bath for 2.5 hours. The oil which formed was dissolved in 25 ml. of benzene and the solution was extracted with 20-ml. portions of 1 N hydrochloric acid and then with two 20-ml. portions of water. The benzene solution was dried over potassium carbonate, filtered and concentrated under reduced pressure. A sample of the oily product was heated at 70–90° under a pressure of 0.01 mm. for 5 minutes.

On analysis, the following results were obtained:

|  | Calculated for $C_{19}H_{28}N_2O_6$ | Found |
|---|---|---|
| Nitrogen | 7.37 | 7.49 |

EXAMPLE II

*Ethyl β'-(α-amino-β,β-dimethyl-γ-hydroxybutyrylamino)-propionate hydrochloride*

The carbobenzoxy group of the β-alanine derivative prepared in Example I, supra, was removed by hydrogenolysis of the compound over a palladium-charcoal catalyst in ethanolhydrochloric acid solution. This reaction yielded the hydrochloride of the amino analog of pantothenic acid as an ethyl ester and is described in detail as follows:

A solution of 7.5 g. (0.02 mole) of ethyl β'-(α-carbobenzoxyamino-β,β-dimethyl-γ-hydroxybutyrylamino)-propionate in 75 ml. of ethanol containing 2 ml. of concentrated hydrochloric acid was hydrogenated over 8 g. of a palladium-Darco catalyst (5% palladium-prepared as shown in Organic Syntheses, vol. 26, page 78, procedure B) for 1.6 hours, during which time 0.016 mole of hydrogen was absorbed. The catalyst was removed by filtration, and the filtrate was concentrated under reduced pressure to an oil containing ethyl β'-(α-amino-β,β-dimethyl-γ-hydroxybutyrylamino)-propionate hydrochloride.

Although it was found convenient to isolate ethyl β'-(α-amino-β,β-dimethyl-γ-hydroxybutyrylamino)-propionate in the form of its hydrochloride salt, it is apparent to those skilled in the art that the free base can be obtained from the salt by conventional methods.

EXAMPLE III

*Ethyl β'-(α-acetylamino-β,β-dimethyl-γ-acetoxybutyrylamino)-propionate*

A 1.5 g. sample of the oil obtained in Example II containing ethyl β'-(α-amino-β,β-dimethyl-γ-hydroxybutyrylamino)-propionate hydrochloride was heated for 5 minutes at 90° C. in a mixture of acetic anhydride and pyridine and then concentrated under reduced pressure. The oily residue was dissolved in 50 ml. of chloroform and washed twice with 25 ml. of water. Evaporation of the chloroform yielded a crystalline product that was recrystallized from chloroform-ether. There was obtained 0.9 g. of ethyl β'-(α-acetylamino-β,β-dimethyl-γ-acetoxybutyrylamino) - propionate, M. P.: 128–129° (micro-block). This diacetyl derivative has the same melting point and infrared absorption spectrum as another sample of the diacetyl derivative which had been synthesized by alternative reactions.

EXAMPLE IV

*Ethyl β'-(α-acetylamino-β,β-dimethyl-γ-hydroxybutyrylamino)-propionate*

A mixture of 3.4 g. of α-acetylamino-β,β-dimethyl-γ-butyrolactone and 2.6 g. of ethyl β-aminopropionate was heated on a steam bath for 2.5 hours. The crystalline solid which formed was dissolved in chloroform and washed with 1 N hydrochloric acid and then with water. Removal of the chloroform under reduced pressure gave a white crystalline residue. Recrystallization of the product from benzene-petroleum ether yielded 2.8 g. of ethyl β'-(α-acetylamino-β,β-dimethyl - γ - hydroxybutyrylamino)-propionate, M. P. 106–112° (micro-block). A 1.6 g. sample was recrystallized twice from benzene; M. P. 113–114° (micro-block)-yield 1 g. On analysis, the following results were obtained:

|  | Calculated for $C_{13}H_{24}N_2O_5$ | Found |
|---|---|---|
| Carbon | 54.15 | 54.49 |
| Hydrogen | 8.39 | 8.06 |
| Nitrogen | 9.72 | 9.63 |

EXAMPLE V

*Ethyl β'-(α-acetylamino-β,β-dimethyl-γ-acetoxybutyrylamino)-propionate*

2 g. of ethyl β'-(α-acetylamino-β,β-dimethyl-γ-hydroxybutyrylamino)-propionate was added to a solution of 15 ml. of acetic anhydride and 12 ml. of pyridine, and the mixture was heated on a steam bath for 5 minutes. The solution was concentrated in vacuo to a crystalline residue which was recrystallized 4 times from a mixture of chloroform and ether to give 1 g. of ethyl β'-(α-acetylamino-β,β-dimethyl -γ- acetoxybutyrylamino)-propionate, M. P. 127–128° (microblock). On analysis, the following results were obtained:

|  | Calculated for $C_{15}H_{26}N_2O_5$ | Found |
|---|---|---|
| Carbon | 54.53 | 54.52 |
| Hydrogen | 7.93 | 7.79 |
| Nitrogen | 8.48 | 8.91 |
| Mol. Wt. | 330.38 | [1] 334.00 |

[1] Ebullioscopic in benzene.

A mixture of the products obtained in Examples III and V melted at 128–129° (micro-block). The region of the infra-red absorption spectrum between 9μ and 13μ was observed on these products mulled in petrolatum. In column A are the absorption bands for the product of Example III; in column B are the bands for the product of Example V. Only strong bands were recorded.

INFRA-RED ABSORPTION DATA

| A | B |
|---|---|
| 12.89μ | 12.88μ |
| 12.31μ | 12.29μ |
| 11.66μ | 11.67μ |
| 11.31μ | 11.31μ |
| 10.78μ | 10.77μ |
| 9.65μ | 9.61μ |

Various changes and modifications may be made in carrying out the present invention without departing from the spirit and scope thereof. Insofar as these changes and modifications are within the scope of the appended claims, they are to be considered as part of this invention.

We claim:

1. As a new physiologically active chemical compound ethyl β'-(α-amino - β,β - dimethyl - γ - hydroxybutyrylamino) - propionate and strong mineral acid salts thereof.

2. As a new chemical compound ethyl β'-(α-carbobenzoxyamino -β,β- dimethyl - γ - hydroxybutyrylamino)-propionate.

3. As a new chemical compound ethyl β'-(α-acetylamino - β,β - dimethyl - γ - acetoxybutyrylamino)-propionate.

4. A method for synthesizing ethyl β'-(α-amino-β,β-dimethyl - γ - hydroxybutyrylamino)-propionate which comprises inter-reacting α-carbobenzoxyamino - β,β - dimethyl-γ-butyrolactone and ethyl-β-amino propionate, subjecting the resulting ethyl β'-(α-carbobenzoxyamino-β,β-dimethyl-γ-hydroxybutyrylamino)-propionate to hydrogenolysis, and recovering the ethyl β'-(α - amino - β,β - dimethyl - γ - hydroxybutyryl - amino)-propionate thus formed.

5. A method for synthesizing ethyl β'-(α-amino-β,β-dimethyl - γ - hydroxybutyrylamino)-propionate which comprises inter-reacting α-carbobenzoxyamino - β,β - dimethyl - γ - butyrolactone and ethyl-β-amino propionate, subjecting the resulting ethyl β'-(α-carbobenzoxyamino-β,β-dimethyl-γ-hydroxybutyrylamino)-propionate to hydrogenolysis using a palladium-charcoal catalyst in an ethanol-hydrochloric acid medium, and recovering the ethyl β'-(α-amino-β,β-dimethyl-γ-hydroxybutyrylamino)-propionate thus formed.

6. The process for preparing ethyl β'-(α-amino-β,β-dimethyl-γ - hydroxybutyrylamino) - propionate which comprises the hydrogenolysis of ethyl β'-(α-carbobenzoxyamino-β,β-dimethyl - γ - hydroxybutyrylamino)-propionate in an acidified alcoholic medium and separating and recovering the thus-produced ethyl ester.

7. The process for preparing ethyl β'-(α-amino-β,β-dimethyl - γ - hydroxybutyrylamino)-propionate which comprises the hydrogenolysis of a solution containing ethyl β'-(α-carbobenzoxyamino - β,β - dimethyl - γ - hydroxybutyrylamino)-propionate and ethanol-hydrochloric acid in the presence of a palladium-carbon catalyst and separating and recovering the thus-produced ethyl ester.

8. The process for preparing ethyl β'-(α-amino-β,β-dimethyl - γ - hydroxybutyrylamino) - propionate which comprises the hydrogenolysis of a solution containing ethyl β'-(α-carbobenzoxyamino-β,β-dimethyl - γ - hydroxybutyrylamino)-propionate and ethanol-hydrochloric acid in the presence of a 5% palladium-carbon catalyst and separating and recovering the thus-produced ethyl ester.

9. A method for the preparation of ethyl β'-(α - acetylamino-β,β-dimethyl-γ-acetoxybutyrylamino)-propionate which comprises inter-reacting α - carbobenzoxyamino - β,β - dimethyl-γ-butyrolactone and ethyl-β-amino propionate, subjecting the resulting ethyl β'-(α-carbobenzoxyamino-β,β-dimethyl - γ - hydroxybutyrylamino)-propionate to hydrogenolysis to obtain ethyl β'-(α - acetylamino-β,β-dimethyl-γ-acetoxybutyrylamino)-propionate hydrochloride, and treating the same with acetic anhydride to form ethyl β'-(α - acetylamino-β,β-dimethyl-γ-acetoxybutyrylamino)-propionate.

10. A method for the preparation of ethyl β'-(α - acetylamino-β,β-dimethyl-γ-acetoxybutyrylamino)-propionate which comprises inter-reacting α - carbobenzoxyamino - β,β - dimethyl-γ-butyrolactone with ethyl-β-amino propionate, subjecting to hydrogenolysis in an ethanol-hydrochloric acid medium the resulting product, ethyl β'-(α-carbobenzoxyamino-β,β-dimethyl - γ - hydroxybutyrylamino)-propionate to obtain ethyl β'-(α-amino-β,β - dimethyl - γ - hydroxybutyrylamino)-propionate hydrochloride, treating the same with acetic anhydride in a pyridine solution and recovering the ethyl β'-(α-acetylamino-β,β-dimethyl - γ - acetoxybutyrylamino)-propionate thus formed.

11. A method for the preparation of ethyl β'-(α - acetylamino-β,β-dimethyl-γ-acetoxybutyrylamino)-propionate which comprises subjecting to hydrogenolysis ethyl β' - (α - carbobenzoxyamino-β,β-dimethyl - γ - hydroxybutyrylamino)-propionate in an ethanol-hydrochloric acid medium thereby obtaining ethyl β'-(α-amino-β,β-dimethyl - γ - hydroxybutyrylamino)-propionate hydrochloride as a product, reacting said product with acetic anhydride in a pyridine solution and recovering the ethyl β'-(α-acetylamino-β,β-dimethyl-γ-acetoxybutyrylamino)-propionate thus formed.

12. A method for the preparation of ethyl β'-(α - acetylamino-β,β-dimethyl-γ-acetoxybutyrylamino)-propionate which comprises reacting ethyl β' - (α - amino - β,β - dimethyl-γ-hydroxybutyrylamino) - propionate hydrochloride with acetic anhydride in a pyridine solution and recovering the ethyl β'-(α-acetylamino-β,β-dimethyl-γ-acetoxybutyrylamino)-propionate thus formed.

13. A method for synthesizing ethyl β'-(α-carbobenzoxyamino - β,β - dimethyl - γ - hydroxybutyrylamino)-propionate which comprises reacting α - carbobenzoxyamino - β,β - dimethyl-γ-butyrolactone with ethyl-β-amino propionate and recovering the ethyl β'-(α-carbobenzoxyamino-β,β - dimethyl - γ-hydroxybutyrylamino)-propionate thus formed.

KARL FOLKERS.
FREDERICK W. HOLLY.

No references cited.